No. 709,190. Patented Sept. 16, 1902.
J. P. WRIGHT.
DIPPING ROLL FOR MATCH MACHINES.
(Application filed Jan. 17, 1902.)
(No Model.) 2 Sheets—Sheet 1.
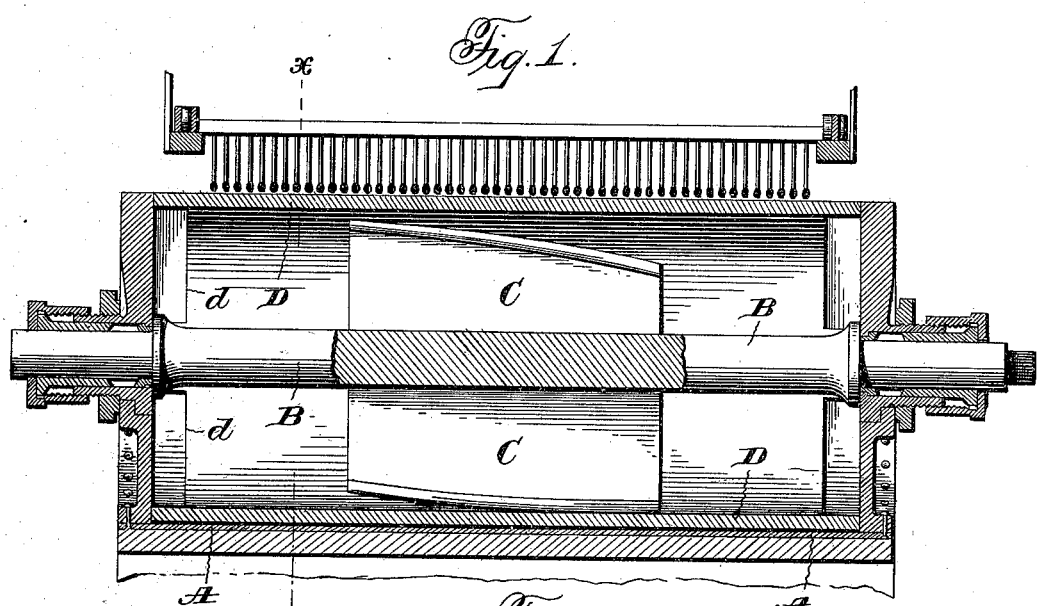
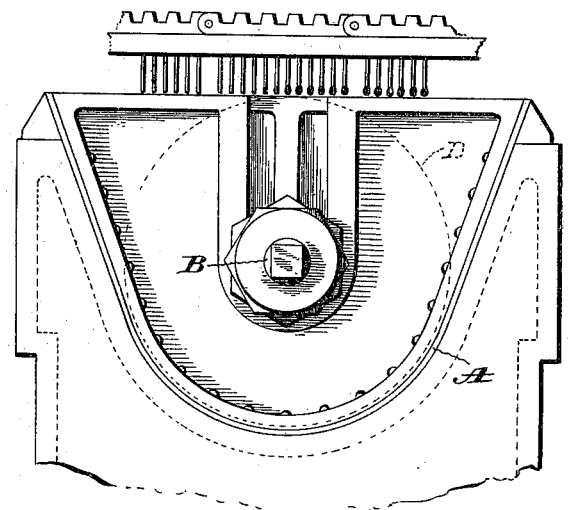
Witnesses:
Jas E. Hutchinson
Henry C. Hazard
Inventor.
Jacob P. Wright,
by Edwin J. Prindle,
his Atty.

No. 709,190. Patented Sept. 16, 1902.
J. P. WRIGHT.
DIPPING ROLL FOR MATCH MACHINES.
(Application filed Jan. 17, 1902.)
(No Model.) 2 Sheets—Sheet 2.

Witnesses:
Jas. E. Hutchinson
Henry C. Hazard

Inventor:
Jacob P. Wright,
by Edwin J. Prindle
his Atty

UNITED STATES PATENT OFFICE.

JACOB P. WRIGHT, OF AKRON, OHIO, ASSIGNOR TO THE DIAMOND MATCH COMPANY, OF NEW YORK, N. Y., A CORPORATION OF ILLINOIS.

DIPPING-ROLL FOR MATCH-MACHINES.

SPECIFICATION forming part of Letters Patent No. 709,190, dated September 16, 1902.

Application filed January 17, 1902. Serial No. 90,173. (No model.)

*To all whom it may concern:*

Be it known that I, JACOB P. WRIGHT, of Akron, in the county of Summit, and in the State of Ohio, have invented certain new and useful Improvements in Dipping-Rolls for Match-Machines; and I do hereby declare that the following is a full, clear, and exact description thereof, reference being had to the accompanying drawings, in which—

Figure 3:
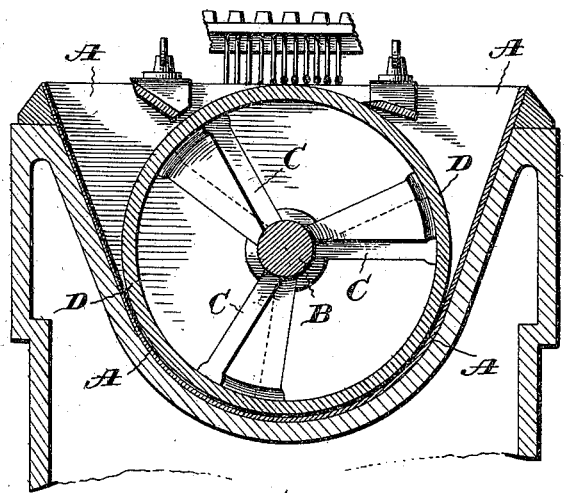
Figure 4:
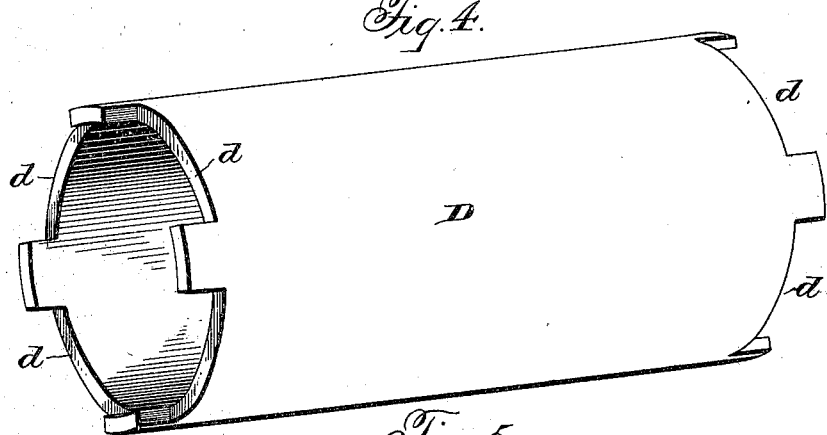
Figure 5:
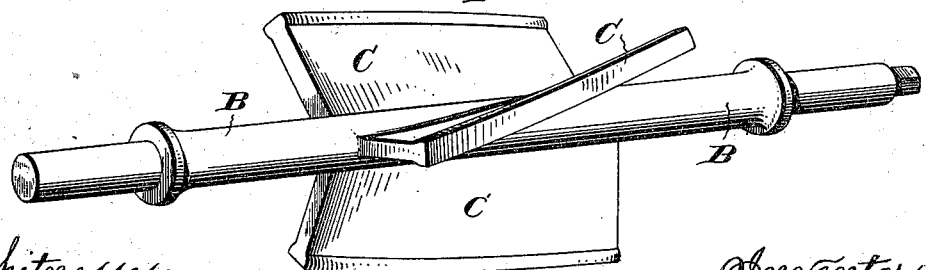

Figure 1 is a longitudinal section of a composition-applying mechanism embodying my invention; Fig. 2, an end elevation thereof; Fig. 3, a cross-section on the line $xx$ of Fig. 1; Fig. 4, a perspective view of the roll, and Fig. 5 a perspective view of the roll-shaft.

Letters of like name and kind refer to like parts in each of the figures.

The object of my invention is to provide a composition-applying mechanism for match-machines having a dipping-roll constructed to serve as a composition-mixing device; and to this end my invention consists in the roll constructed substantially as hereinafter specified.

In the carrying of my invention into practice any desired form of composition-holding receptacle A may be employed. Said receptacle or vat A has in cross-section a lower portion that is semicircular and an upper portion with straight outwardly-flaring or diverging sides and has end walls with bearings for a shaft B, that extends through the vat concentric with the semicircular portion thereof. Equidistant from each other on the shaft are radially-projecting arms or ribs C and C, preferably, but not necessarily, three, on which is mounted the roll D in the form of a hollow cylinder that extends from end to end of the vat A. Notches $d$ and $d$, of considerable extent circumferentially, are provided in each end of the roll, through which there may be communication between the inside and outside thereof. The diameter of the roll is such that but a very small space is left between it and the curved lower portion of the vat A. The arms or ribs C and C extend obliquely to the roll-axis, each having a spiral form, and preferably said arms or ribs are shorter than the roll, as shown, to facilitate cleaning the interior thereof. Power for revolving the roll being applied through the shaft B and the proper quantity of composition being in the vat, it will be seen that by the action of the inclined or spiral ribs the composition will be forced longitudinally through the roll, it passing from the interior thereof to the exterior through the notches or passages $d$ and $d$ at one end of the roll and returning to the interior of the roll through the notches or passages $d$ and $d$ at the other end thereof. Besides the movement of the composition lengthwise of the roll produced by the spiral ribs it is evident that it is also moved crosswise thereof and lifted by said ribs, so that thorough mixing is effected by its circulation, and precipitation of the matters of greater specific gravity is prevented. The lugs that are formed on the ends of the roll by the notches $d$ and $d$ therein assist the mixing and prevent precipitation by acting on the composition that passes through the notches.

As a roll of large diameter is secured as a result of my construction, important advantages are gained in the performance of its function in the dipping of the splints. Thus where the composition is light more of it is carried up on the exterior of the roll than is possible with a roll of less diameter, and consequent sharper curvature of its periphery, and for the same reason composition is presented to the splints for a longer period of time, and therefore better results secured in the application of composition to the splints.

It is to be understood that changes in the details of construction I have shown can be made which will involve no departure from the scope of my invention.

Having thus described my invention, what I claim is—

1. The combination of a composition vat or receptacle, a hollow dipping-roll, and means within the roll for agitating the composition, substantially as and for the purpose described.

2. The combination of a composition vat or receptacle, a hollow dipping-roll, and means for causing movement of the composition through the roll, substantially as and for the purpose described.

3. The combination of a composition vat or receptacle, a hollow dipping-roll, having passages between its interior and exterior, and means for causing circulation of the composition into, through and out of the roll, substantially as and for the purpose described.

4. The combination of a composition vat or receptacle, a hollow dipping-roll, having passages between its interior and exterior, and means within the roll for causing circulation of the composition, substantially as and for the purpose described.

5. The combination of a composition vat or receptacle, a hollow roll, and spiral arms therein, substantially as and for the purpose described.

6. The combination of a composition vat or receptacle, a hollow roll, a shaft, and spiral arms between the shaft and roll, substantially as and for the purpose described.

7. The combination of a composition vat or receptacle, a hollow roll having passages at its ends, a shaft, and spiral arms between the shaft and roll, substantially as and for the purpose described.

8. The combination of a composition vat or receptacle, and a hollow roll whose ends have projecting lugs between which are spaces for the passage of composition, substantially as and for the purpose described.

9. The combination of a composition vat or receptacle, a hollow roll whose ends have projecting lugs between which are spaces for the passage of composition, and means for causing composition to pass through the roll, substantially as and for the purpose described.

In testimony that I claim the foregoing I have hereunto set my hand this 25th day of November, 1901.

JACOB P. WRIGHT.

Witnesses:
B. C. ROSS,
O. A. TICKNER.